US010043281B2

(12) United States Patent
Mallinson et al.

(10) Patent No.: US 10,043,281 B2
(45) Date of Patent: Aug. 7, 2018

(54) APPARATUS AND METHOD FOR ESTIMATING EYE GAZE LOCATION

(71) Applicant: Sony Computer Entertainment Inc., Tokyo (JP)

(72) Inventors: Dominic Saul Mallinson, Redwood City, CA (US); Eric James Larsen, Pacifica, CA (US); Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 84 days.

(21) Appl. No.: 14/820,390

(22) Filed: Aug. 6, 2015

(65) Prior Publication Data

US 2016/0364881 A1 Dec. 15, 2016

Related U.S. Application Data

(60) Provisional application No. 62/175,390, filed on Jun. 14, 2015.

(51) Int. Cl.
| | |
|---|---|
| *G06K 9/00* | (2006.01) |
| *G06T 7/20* | (2017.01) |
| *G06F 3/01* | (2006.01) |
| *G06T 7/70* | (2017.01) |

(52) U.S. Cl.
CPC .............. *G06T 7/20* (2013.01); *G06F 3/013* (2013.01); *G06F 3/015* (2013.01); *G06K 9/00604* (2013.01); *G06T 7/70* (2017.01); *G06T 2207/30241* (2013.01)

(58) Field of Classification Search
None
See application file for complete search history.

(56) References Cited

U.S. PATENT DOCUMENTS

| | | | |
|---|---|---|---|
| 9,339,182 B2* | 5/2016 | Chen | A61B 3/14 |
| 9,449,446 B1* | 9/2016 | Mullin | G07C 9/00158 |
| 2002/0085174 A1* | 7/2002 | Bolger | A61B 3/113 |
| | | | 351/209 |

(Continued)

FOREIGN PATENT DOCUMENTS

WO    WO 2015/044851 A2 *    4/2015

OTHER PUBLICATIONS

Patent Cooperation Treaty; "International Search Report" issued in corresponding PCT Application No. PCT/US16/35880, dated Aug. 31, 2016, 2 pages.

(Continued)

*Primary Examiner* — Tahmina Ansari
(74) *Attorney, Agent, or Firm* — Fitch, Even, Tabin & Flannery, LLP

(57) ABSTRACT

A method for tracking eye movement is provided. One embodiment of the method includes receiving a first measurement from a first sensor configured to detect a gaze location, determining an initial gaze location based at least on the first measurement, receiving at least one of eye motion amplitude and eye motion direction measurement from a second sensor, and determining an estimated gaze location based at least on the initial gaze location and the at least one of eye motion amplitude and eye motion direction. Systems perform similar steps, and non-transitory computer readable storage mediums each store one or more computer programs.

23 Claims, 4 Drawing Sheets

(56) References Cited

U.S. PATENT DOCUMENTS

| | | | |
|---|---|---|---|
| 2004/0174496 A1* | 9/2004 | Ji | G06F 3/013 351/209 |
| 2005/0024586 A1* | 2/2005 | Teiwes | A61B 3/113 351/209 |
| 2014/0049452 A1* | 2/2014 | Maltz | G06F 3/013 345/8 |
| 2014/0055591 A1* | 2/2014 | Katz | G06F 3/013 348/78 |
| 2016/0235323 A1* | 8/2016 | Tadi | A61B 5/7285 |
| 2016/0364881 A1* | 12/2016 | Mallinson | G06T 7/20 |

OTHER PUBLICATIONS

Patent Cooperation Treaty; "Notification of Transmittal of the International Search Report and the Written Opinion of the International Searching Authority, or the Declaration" issued in corresponding PCT Application No. PCT/US16/35880, dated Aug. 31, 2016, 2 pages.

Patent Cooperation Treaty; "Written Opinion of the International Searching Authority" issued in corresponding PCT Application No. PCT/US16/35880, dated Aug. 31, 2016, 11 pages.

Wikipedia; "Eye tracking", https://en.wikipedia.org/wiki/Eye_tracking, printed on Feb. 26, 2016, pp. 1-8.

Wikipedia; "Optical flow", https://en.wikipedia.org/wiki/Optical_flow_sensor, printed on Feb. 26, 2016, pp. 1-4.

Wikipedia; "Saccade", https://en.wikipedia.org/wiki/Saccades, printed on Feb. 26, 2016, pp. 1-5.

\* cited by examiner

APPARATUS AND METHOD FOR ESTIMATING EYE GAZE LOCATION

CROSS-REFERENCE TO RELATED APPLICATION

This application claims the benefit of U.S. Provisional Patent Application No. 62/175,390, filed on Jun. 14, 2015, entitled "APPARATUS AND METHOD FOR HYBRID EYE TRACKING," the entire disclosure of which is hereby fully incorporated by reference herein in its entirety.

BACKGROUND OF THE INVENTION

1. Field of the Invention

The present invention relates generally to motion tracking, and more specifically to eye tracking.

2. Discussion of the Related Art

Eye tracking is the process of tracking the point of gaze or the motion of an eye relative to the head. Conventionally, gaze tracking is based on capturing images of an eye and analyzing the image to obtain a gaze position.

SUMMARY OF THE INVENTION

One embodiment provides a method comprising: receiving a first measurement from a first sensor configured to detect a gaze location, determining an initial gaze location based at least on the first measurement, receiving at least one of eye motion amplitude and eye motion direction measurement from a second sensor, and determining an estimated gaze location based at least on the initial gaze location and the at least one of eye motion amplitude and eye motion direction.

Another embodiment provides a system comprising: a first sensor configured to detect a gaze location, a second sensor configured to measure at least one of eye motion amplitude and eye motion direction, and a processor communicatively coupled to the first sensor and the second sensor. The processor being configured to: receive a first measurement from the first sensor, determine an initial gaze location based on the first measurement, receive at least one of motion amplitude and motion direction measurement from the second sensor, and determine an estimated gaze location based at least on the initial gaze location and the at least one of eye motion amplitude and eye motion direction.

Another embodiment provides a system comprising: a first sensor configured to detect a gaze location, a second sensor configured to measure at least one of eye motion amplitude and eye motion direction, and a processor communicatively coupled to the first sensor and the second sensor and configured to determine an estimated gaze location during a data reporting interval of the first sensor based on at least one of eye motion amplitude and eye motion direction measured by the second sensor.

Another embodiment provides a non-transitory computer readable storage medium storing one or more computer programs configured to cause a processor based system to execute steps comprising: receiving a first measurement from a first sensor configured to detect a gaze location; determining an initial gaze location based at least on the first measurement; receiving at least one of eye motion amplitude and eye motion direction measurement from a second sensor; and determining an estimated gaze location based at least on the initial gaze location and the at least one of eye motion amplitude and eye motion direction.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

Typical eye gaze tracking systems track a user's gaze through optical systems such as cameras. Conventional low cost camera systems currently operate at 60 Hz. Some parts of gaze such as saccades can happen very rapidly. One approach to increase the sampling rate of the gaze tracking system is to use a higher frequency camera system. However, such an approach would add expense for the camera as well as the necessary image processing.

This disclosure describes a gaze tracking system that combines the camera data with low latency signals, such as for example an electrical muscle signal measured via electromyography (EMG). EMG measured close to the eye muscles gives a signal corresponding to how that muscle is being driven by the brain. While these EMG signals may not provide accurate eye position measurements, they do provide a low latency signal that indicates the eye is about to start moving and the approximate direction and/or amplitude of the eye motion. A sensor fusion model may be used to estimate the eye motion that takes place between the muscle activation and the next optical (camera) measurement. Once the optical measurement is made, the motion prediction of the muscle signal can be corrected and the combined (fused) signals will give more reliable intermediate eye position data. A Kalman filter may be used in some embodiments to fuse the two signals.

In some embodiments, this sensor fusion technique may be used not only for tracking eye direction or gaze, but also or alternatively for tracking or detecting eye position or the motion of an eye relative to the head. For example, eye position may be useful to cancel lens distortion dynamically. Therefore, in some embodiments, camera data is combined with low latency signals to form a hybrid system and/or method for eye tracking, which in some embodiments may be used for gaze tracking and/or estimating gaze direction.

Figure 1:
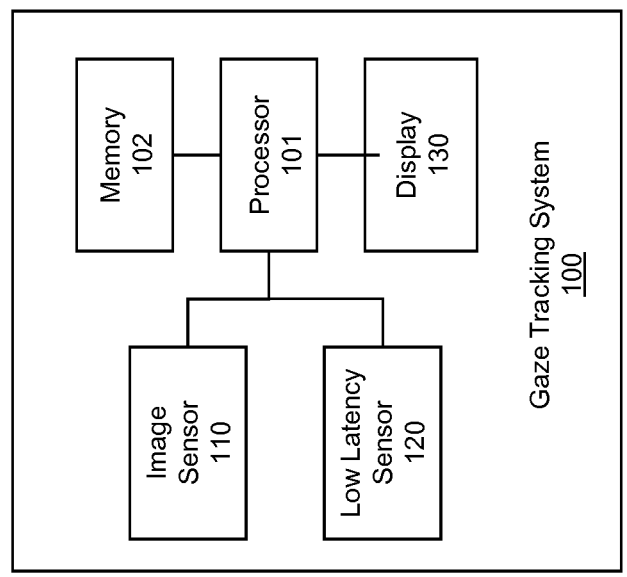
FIG. 1 is a block diagram illustrating a system for tracking gaze and/or eye movement in accordance with some embodiments of the present invention.

A more detailed description will now be provided. Referring first to FIG. 1, there is shown a system for tracking gaze and/or eye movement that may be used to run, implement and/or execute any of the methods and techniques shown and described herein in accordance with some embodiments of the present invention. The gaze tracking system 100 includes a processor 101, a memory 102, a display 130, an image sensor 110, and a low latency sensor 120. The gaze tracking system 100 may comprise, or be included with, one or more of a head mounted device ("HMD"), an augmented reality device, a virtual reality device, a wearable device, a portable user device, a smartphone, a personal computer, a television, a tablet computer, a game console, etc. Generally, the gaze tracking system 100 may comprise any processor-based device having at least two types of sensors.

The memory 102 may include one or more of a volatile and/or non-volatile computer readable memory devices. In some embodiments, the memory 102 stores computer executable code that causes the processor 101 to automatically track the movement of a user's eye based on signals from two sensors such as the image sensor 110 and the low latency sensor 120. The computer readable instructions may instruct the processor to determine locations based on information from the image sensor 110 and estimate locations between each measurement by the image sensor 110 with the information provided by the low latency sensor 120. The memory 102 may further store an eye movement model used in tracking the movement of the user's eye. The eye movement model may include parameters calibrated for individual users through one or more of the calibration processes described herein. In some embodiments, the memory 102 further stores computer executable code that causes the processor 101 to provide interactive audio and video content to the user based on the tracked eye movement. For example, the interactive video content may be virtual reality or augmented reality content. In some embodiments, computer executable code causes the processor 101 to perform one or more steps described herein with reference to FIGS. 2 and 4 below. In some embodiments, the memory 102 may be at least partially implemented by one or more of a local, remote, and a cloud-based storage.

The image sensor 110 may be or comprise one or more of a camera, an optical sensor, an optical image sensor, an infrared sensor, and the like. Generally, the image sensor 110 is configured to determine an eye gaze position based on at least one frame of a captured image. The detected eye gaze position may be relative to the frame of the captured image and/or the head of the user. For example, the image sensor 110 may capture an image of the pupil of an eye, and a gaze location may be determined based on the location of the center of the pupil within the captured frame. This locations may be referred to as an absolute location as it provides a gaze location coordinate within a frame of reference.

In some embodiments, the low latency sensor 120 is generally a sensor that can provide at least one of eye movement amplitude and direction information and has a lower latency as compared to the image sensor 110. In some embodiments, the low latency sensor 120 may be or comprise one or more of an electromyography (EMG) sensor, a low resolution image sensor, a high frame-rate image sensor, an optical reflector sensor, a range sensor, an optical flow sensor, and a microphone. An EMG sensor is a sensor that detects the electrical potential generated by muscle cells. An EMG placed on or in proximity of the orbital or periorbital region of an eye can measure the amplitude and/or direction of eye movement based on electrical potential generated by muscles that control eye movement (e.g. the lateral rectus, the medial rectus, the inferior rectus, the superior rectus, the inferior oblique muscles, etc.). In some embodiments, the EMG sensor may be placed directly on the skin of the user over the muscle that the sensor is configured to measure. In some embodiments, the EMG sensor does not contact the skin of the user.

An optical reflector sensor may be a sensor that detects eye movement by detecting changes in light reflected off of the eyeball. For example, an optical reflector sensor may work in a similar manner as an optical track ball device. A range sensor may be any sensor configured to detect the presence of nearby objects without physical contact, such as a Doppler sensor, a passive optical sensor, an infrared sensor, a radar, and the like. Since a human eyeball is not perfectly spherical, the proximity between a sensor at a fixed distance from the skull of a user and the portion of the eyeball in the sensor's direct line-of-sight changes with eye movement. For example, the cornea of an eye is raised relative to the sclera, therefore, a shorter detected range may indicate that the cornea is in the sensor's direct line-of-sight. An optical flow sensor may be an image sensor configured to measure optical flow and/or visual motion. For example, an optical sensor may be an image sensor coupled to a processor running an optical flow algorithm. An optical flow sensor may be used to optically detect the motion of an eye. A microphone may be used to detect audio signals produced by eye movement. For example, amplitude of the sound produced by an eye movement may correspond to the amplitude of the eye movement. Directional eye movement may also be detected based on their respective sound profile.

Generally, the low latency sensor 120 has a higher sampling rate and/or data collection rate as compared to the image sensor 110 and is configured to provide one or more data points between each frame captured by the image sensor 110. In other words, the image sensor has a higher data collection and/or sampling latency as compared to the low latency sensor 120. In some embodiments, the low latency sensor 120 may be able to capture data at a higher sampling rate (e.g. 120 Hz) as compared to the image sensor 110 (e.g. 60 Hz). In some embodiments, the low latency sensor 120 output data that requires less processing as compared to the image sensor 110. For example, the image sensor 110 may output an image that requires image analysis to obtain a location, while the low latency sensor 120 may output an EMG voltage reading which can be directly converted to an acceleration vector value through a simple lookup table. Generally, the latency of a sensor may be based on how fast the sensor can capture information and/or how fast the sensor signal may be processed to obtain useful data. For example, the latency of a camera may effectively be the speed at which the captured images can be processed to obtain eye position, even if the camera is capable of capturing images at a higher speed. Conversely, if a processor can analyze the camera image faster than at 60 Hz, the latency of a conventional camera is still limited by its frame rate of 60 Hz. Generally, the rate at which data can be sampled and processed may be referred to as the sensor's data reporting latency. In some embodiments, the data reporting latency of a sensor corresponds to the larger of the sensor's sampling latency and the data processing latency.

The low latency sensor 120 may provide at least one of eye motion amplitude and eye motion direction measurement. For example, the low latency sensor may measure one or more of an acceleration, speed, velocity, and direction of eye movement. Herein, amplitude may generally refer to acceleration or speed amplitude. In some embodiments, the image sensor 110 provides an absolute position measurement (such as a location) while the low latency sensor 120 provides a derivative measurement (such as direction, acceleration, and/or speed). For example, the image sensor 110 may provide a coordinate within the frame of the image, while the low latency sensor 120 may provide a movement relative to the previously determined coordinate. Further details of using measurements from the image sensor 110 and low latency sensor 120 to track eye movement is discussed below with reference to FIGS. 2 and 3.

The display 130 may be or comprise one or more of a display screen, a projection device, an augmented reality display device, a virtual reality display device, a HMD, and the like. Generally, the display 130 is configured to show computer generated graphics from the processor 101 to a user. While the display 130 is shown to be part of the gaze tracking system 100, in some embodiments, the display 130 may be separately implemented from the gaze tracking system 100. The gaze tracking system 100 may track the user's eye movement as the user views the computer generated graphics shown by the display 130 and/or a real-world scenes.

In some embodiments, the gaze tracking system 100 further includes a physical structure that holds, supports, and/or mounts the image sensor 110 and the low latency sensor 120 in positions suitable for tracking a user's eye movement. For example, in some embodiments, the physical structure may hold a camera slightly in front the user's eye and an EMG sensor directly on or in close proximity of the outer corner of the user's eye. In some embodiments, both the image sensor 110 and the low latency sensor may be positioned in front of the user. Examples of gaze tracking systems according to some embodiments are provided in FIGS. 5A-5B below. In some embodiments, only one eye is tracked, while in other embodiments, the system tracks both eyes with sets of sensors. In some embodiments, one or more of the image sensor 110 and low latency sensor 120 comprise multiple sensor and/or sensor types.

In some embodiments, the gaze tracking system 100 may include other input/output devices such as speakers, audio output ports, keys, touch pads, touch screens, microphones, gyroscopes, wireless transceivers, and the like. In some embodiments, one or more methods and functions described herein may be performed by a remote device and communicated to the gaze tracking system 100 via a wired or wireless data connection. In some embodiment, the processor 101 is configured to use the tracked eye movement and data received from a remote source to determine the content to display to the user on the display 130. For example, the processor 101 may cause the display 130 to display local or external content in an augmented reality or virtual reality manner based on the user's tracked eye movement. In some embodiments, each component shown in FIG. 1 is enclosed and/or affixed to a portable housing such as a HMD and a wearable device. In some embodiments, one or more components shown in FIG. 1 may be separately implemented and communicate with the system through a wired or wireless connection. For example, the image sensor 110 and low latency sensor 120 may be an eye tracking device placed near a computer monitor and the memory 102 and the processor 101 shown FIG. 1 may be implemented with a personal computer system, a game console, or an entertainment system.

Figure 2:
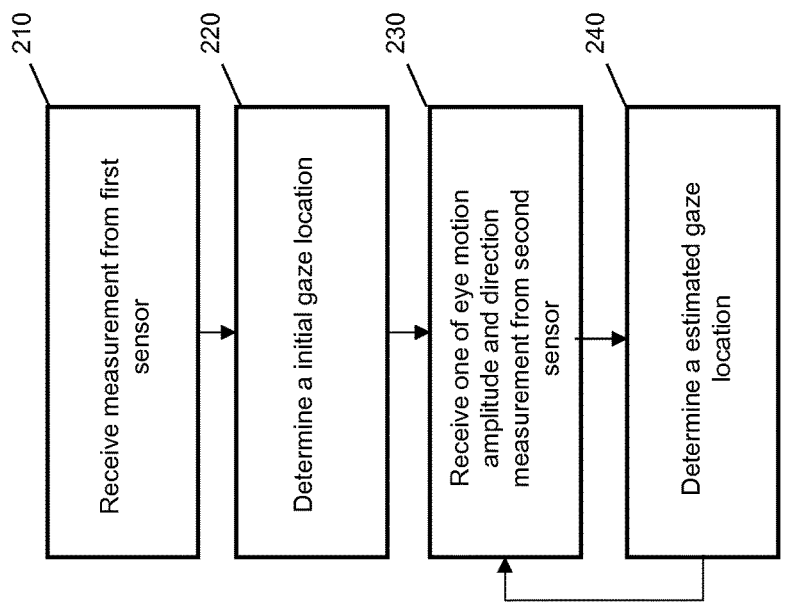
FIG. 2 is a flow diagram illustrating a method for tracking gaze and/or eye movement in accordance with some embodiments of the present invention.

Referring to FIG. 2, there is illustrated an example of a method 200 for tracking eye gaze and/or movement. In some embodiments, steps of method 200 may be performed by one or more server devices, user devices, or a combination of server and user devices. Generally, the steps of method 200 may be performed by one or more processor-based devices such the processor 101 of the gaze tracking system 100 and/or other control circuits.

In step 210, the system receives measurement from a first sensor. Generally, the first sensor may be any sensor configured to provide sufficient information for the system to determine an initial gaze location in step 220. For example, the first sensor may be or comprise the image sensor 110 shown in FIG. 1 and may be one or more of a camera, an optical sensor, an optical image sensor, an infrared sensor, and the like. Generally, the first sensor is configured to determine an eye gaze position within at least one frame of a captured image.

In step 220, the system determines an initial gaze location based on the measurement from step 210. The initial eye gaze position may be a location relative to the frame of the captured image and/or the head of the user. Such a location may be referred to as a determined location. For example, the first sensor may capture an image of the pupil of an eye and a gaze location may be determined based on the location of the center of the pupil within the captured frame. The initial gaze location may further be determined based on an eye movement model which may be selected based on a demographic profile of the user and/or be calibrated and individualized for that user. The initial gaze location may further be based on a history of determined and/or estimated gaze location. For example, the system may determine two or more possible gaze locations based on analyzing an image captured by a camera, and select one of the locations based on its proximity to the last detected gaze location and/or the last detected eye movement direction.

In step 230, the system receives one of eye motion amplitude and direction measurement from a second sensor. The second sensor may be or comprise the low latency sensor 120 shown in FIG. 1. In some embodiments, the low latency sensor can measure one or more of an acceleration, speed, velocity, and direction of eye movement. Herein, amplitude may refer to acceleration or speed amplitude. In some embodiments, the first sensor provides an absolute position measurement while the second sensor provides a derivative measurement. For example, the first sensor may provide a coordinate within the frame of the image, while the second may provide a relative movement measurement such as acceleration, speed, and/or direction. The low latency sensor 120 may be one or more of an electromyography (EMG) sensor, a low resolution image sensor, a high frame-rate image sensor, an optical reflector sensor, a range sensor, an optical flow sensor, and a microphone. Generally, the second sensor has a lower latency as compared to the first sensor. The latency of a sensor may be based on one or more of the sensor's data collection rate (e.g. image capture frame rate) and the system's ability to process the collected data (e.g. image analysis speed). Generally, a sensor's data reporting latency may correspond to the slower of the image capture frame rate and the image analysis speed.

In step 240, the system estimates a gaze location based at least on the initial gaze location and the at least one of eye motion amplitude and eye motion direction. While the second sensor may not provide sufficient information to determine a gaze location on its own, it may provide movement information such that a location may be estimated based on the movement information relative to the last determined location. Such a location may be referred as derived location or estimated location. The estimated location may correspond to the location of the gaze at the time that the second sensor takes a measurement or may correspond to a predicted gaze location at a time shortly after the second sensor measurement.

In some embodiments, the measurement from the second sensor is first converted to at least one of amplitude and direction. In some embodiments, an eye movement model may be used to convert the second sensor measurement to one of eye movement distance and direction. For example, in some embodiments, the second sensor is an EMG sensor, and the measured muscle voltage may be converted to a movement amplitude value, which is in turn used to calculate a distance from the initial gaze location. In such embodiments, the voltage measured at the onset of a movement would be used to predict a gaze movement distance and estimate a location of the gaze shortly after the onset of the movement. In some embodiments when only one of amplitude and direction is determined based on the second sensor, the other measurement may be estimated by the system based on a history of the user's eye gaze. For example, the system may assume the user's gaze is continuing in the same direction, speed, acceleration, deceleration etc. based on a previously determined eye movement path. Combining the distance and/or direction information with the previously determined location information allows the system to estimate the next gaze location.

In some embodiments, the estimated gaze location is determined based on a plurality of first sensor measurements and second sensor measurements. The system may store a gaze location history and use the history to project the likely estimated gaze location in conjunction with more recent measurements from the sensors. For example, if a measurement from the first or the second sensor deviates substantially from the previous eye movement pattern, the system may disregard that measurement as noise or error. In some embodiments, the plurality of measurements from the two sensors and/or plurality of previously determined locations may be fused and the fused data be used for tracking eye movement. For example, the two sensors may be fused using a Kalman filter to determine an estimated gaze location. The fused signals may also be used to predict a future gaze location based on measurements from both sensors. Generally, steps 220 and 240 may each be based on one or more of the first sensor's measurement, the second sensor's measurements, a gaze location history, and an eye movement model.

In some embodiments, after step 240, steps 230 and 240 may be repeated until the first sensor can take another measurement in step 210. For example, if the first sensor operates at 60 Hz and the second sensor is able to sample at 240 Hz, steps 230 and 240 may be repeated four times before the method returns to step 210.

Since each individual's physiology varies, in some embodiments, prior to tracking eye gaze as shown in FIG. 2, the system may lead a user through a calibration sequence to generate or configure an eye movement model individualized for the user. For example, the system may instruct a user to follow a dot with their eyes in one or more eye movement patterns. The system may then compare the measurements obtained by the sensors to the known eye movement pattern to configure the eye movement model for that user. The eye movement model may then be used to determine user's gaze location in steps 220 and/or 240.

In some embodiments, in addition to or instead of performing a calibration sequence, after step 240, the estimated gaze location may be stored for the purpose of calibrating the eye movement model used to estimate future gaze locations. For example, the estimated gaze location may be compared with subsequently determined gaze locations to see if the parameters used to convert the detected signals to eye movement are accurate. An example of the feedback calibration process is described herein with reference to FIG. 4 below.

The determined gaze location and the estimated gaze location may be used for various applications. For example, the locations may be used for rendering computer generated graphics to the user to provide virtual reality or augmented reality scenes to a user. In virtual reality and augmented reality applications, the content and the perspective of the rendered scene may be determined based on the location of the user's gaze. The additional locations estimated in step 240 allows for better prediction of gaze location such that a computer may better determine how to render one or more frames of images to display to the user. The tracked gaze location may also be used as user input for various interactive content.

In some embodiments, the gaze location information determined in FIG. 2 may be used in conjunction with foveated rendering. Foveated rendering is a technique in which the image resolution or amount of detail varies across the image according to fixation points. The determined and estimated gaze location may be used to predict a future gaze location which allows the computer to determine the fixation point of the user when the next frame is displayed. The increased sampling rate of the gaze tracking system also allows for the detection of fast eye motions such as saccades.

While two sensors are discussed herein, each sensor may include two or more sensor device units. In some embodiments, three of more sensors types may similarly be used to track gaze location. For example, signals from a camera, an EMG sensor, a range sensor, and an optical flow sensor may be combined to track eye movement.

Figure 3A:
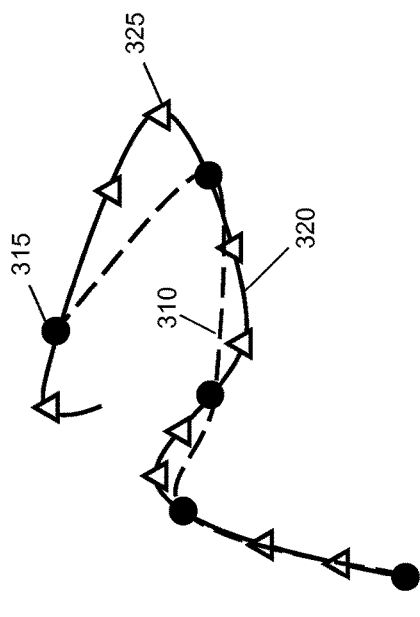
FIG. 3A-3B are illustrations of tracked eye gaze paths in accordance with some embodiments of the present invention.

Referring to FIG. 3A, there is shown an illustration of tracked gaze paths based on one and two sensors. In FIG. 3A, solid circles 315 represent locations determined based on a first sensor, such as the image sensor 110 in FIG. 1 and the first sensor described with reference to FIG. 2. These locations are generally referred to as "determined locations" because they are based mainly on the measurements from an absolute location sensor such as an image sensor. The dashed line 310 represents a tracked gaze path based only on data collected from a first sensor.

When a second, lower latency sensor is added to the system, additional estimated locations may be determined. In FIG. 3A, hollow triangles 325 represent locations determined based in part on measurements from a second sensor, such as the low latency sensor 120 in FIG. 1 and the second sensor described with reference to FIG. 2. These locations are generally referred to as "estimated locations" because they are based mainly on the measurements from a derivative sensor that provide direction and/or amplitude information. Since the second sensor has a lower latency as compared to the first sensor, the second sensor may provide additional data points between each measurement taken by the first sensor. The solid line 320 represents a tracked gaze path on data collected by both the sensors, which can be more precise as compared to the path tracked with the image sensor alone (dashed line 310).

Figure 3B:
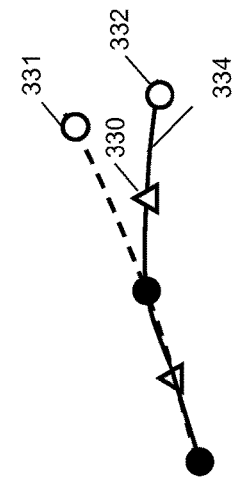

Referring to FIG. 3B, there is shown an illustration of an eye gaze location prediction based on one and two sensors. Similar to FIG. 3A, the solid circles in FIG. 3B represent locations determined based on measurements from the first sensor. With locations determined based on the first sensor measurements alone, the predicted trajectory of the gaze would follow the dashed line and the predicted next gaze location may fall on a location represented by the hollow circle 331. When a second sensor is added, additional data points (hollow triangle 330) would provide a different gaze trajectory represented by the solid line 334. As such, the predicted gaze location may fall on the locating represented by the hollow circle 332.

As illustrated in FIGS. 3A-3B, by adding a low latency sensor that provides derivative measurements, a more precise gaze path may be tracked as compared to using only an absolute measurement sensor. The higher sampling resulting from the use of two sensors also allows for a better prediction of future gaze locations and lower latency of the overall system. FIGS. 3A-3B are provided as illustrations of concepts only and do not correspond to actual eye tracking results or predictions and are not necessarily to scale.

Figure 4:
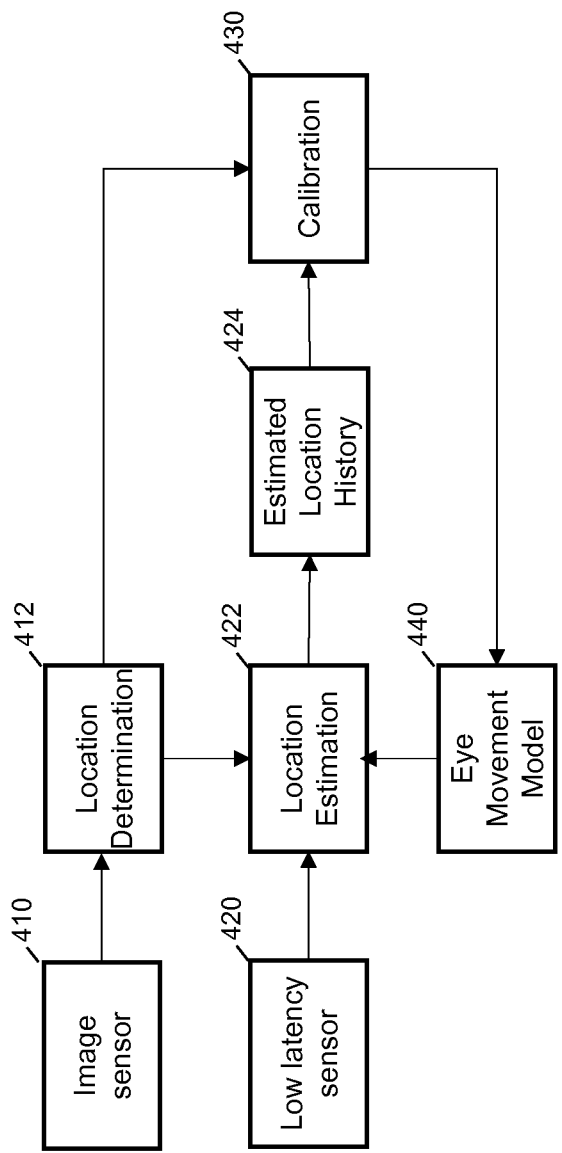
FIG. 4 is a block diagram illustrating a calibration process in accordance with some embodiments of the present invention.

Referring to FIG. 4, there is illustrated an example of a process for tracking eye movement with feedback calibration. The image sensor 410 is configured to capture an image of an eye and provide the image to a location determination module 412. The image sensor 410 may be the image sensor 110 shown in FIG. 1 and may be one or more of a camera, an optical sensor, an optical image sensor, an infrared sensor, and the like.

The location determination module 412 analyzes the image captured by the image sensor 410 and determines a gaze location. The location determination module may use a gaze location history and/or an eye movement model in determining the gaze location. Before the image sensor 410 outputs a second image, the low latency sensor 420 provides eye movement amplitude and/or direction reading to the location estimation module 422. The location estimation module 422 combines at least the output of the low latency sensor, a previously determined or estimated location, and an eye movement model 440 to estimate a location of the eye gaze. In some embodiments, the location estimation module 422 may convert the output of the low latency sensor into distance and/or direction values based on the eye movement model 440. The location estimation module 422 may further estimate the location based on multiple locations determined by both the location determination module 412 and the location estimation module 422. For example, a Kalman filter may be used by the location estimation module 422 to determine how the measurements should be combined and whether any data point should be disregarded as noise.

The location estimated by the location estimation module 422 is stored in the estimated location history 424. Depending on the relative sampling rate of the image sensor 410 and the low latency sensor 420, the location estimation module may estimate multiple locations prior to the location determination module 412 determining the next location based on an image captured by the image sensor 410.

When the image sensor 410 captures another image and the location determination module 412 determines another location based on information from the image sensor 410, the determined location is compared to the estimated location history 424 by a calibration module 430. The calibration module 430 uses the newly determined location to determine whether the locations stored in estimated location history 424 are accurate. For example, the calibration module 430 may determine whether each of the estimated locations could logically fall between the preceding and subsequent locations determined based on the image sensor 410 and the location determination module 412. In another example, the calibration module 430 may determine whether a location predicted based on the estimated locations corresponds to the actual measured location from the location determination module 412. The calibration module 430 then updates the eye movement model 440 based on the comparison. For example, if the low latency sensor is an EMG sensor and the predicted locations tend to overshoot the determined location, the eye movement model may be adjusted to correspond a shorter eye movement distance to the voltage readings of the EMG sensor. In some embodiments, the system may start with a default eye movement model and adjust and update the model based on the process shown in FIG. 4. In some embodiments, the eye movement model may further include a prediction model for predicting a future gaze location based on a past eye movement pattern, and the prediction model may be updated in a similar manner.

While the eye movement model 440 is shown to be used by the location estimation module 422 in FIG. 4, in some embodiments, the location determination module 412 also uses the same or a different eye movement model 440. In some embodiments, locations determined by the location determination module 412 are also stored in a location history for calibration purposes. In some embodiments, the stored determined location history and the estimated location history 424 may be used by one or both of the location determination module 412 and the location estimation module 422 to determine gaze location. In some embodiments, the calibration module 430 may also base its calibration on estimated location history 424 and determined location history and update the eye movement model 440 accordingly.

Figure 5B:
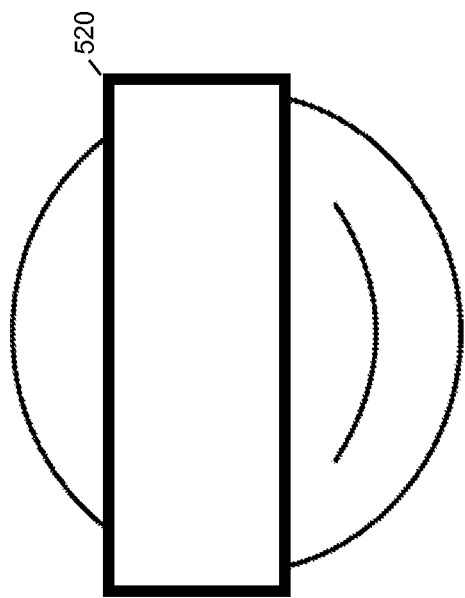
FIGS. 5A-5B are illustrations of head mounted devices in accordance with some embodiments of the present invention.
Figure 5A:
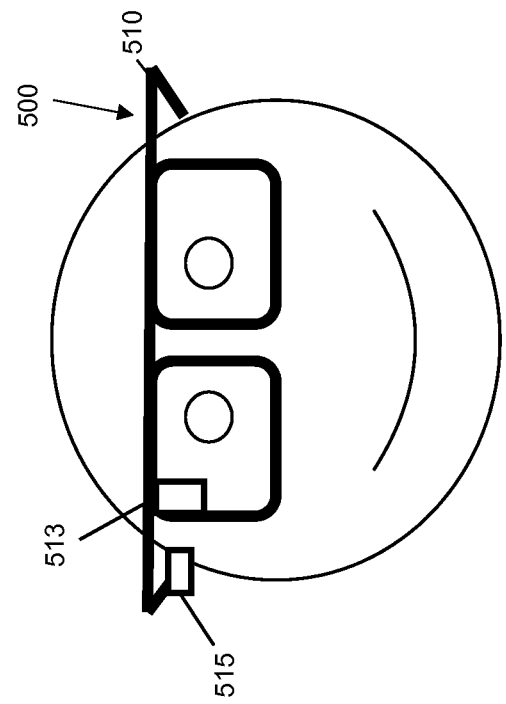

Referring to FIG. 5A, there is shown an illustration of an augmented reality type HMD with which the technique disclosed herein may be implemented. The HMD device 500 includes a frame 510 holding sensors 513 and 515 in positions suitable for tracking a user's eye movement. The HMD device 500 also includes a display device (not shown) that is configured to provide an augmented reality scene to the user. The first sensor 513 may be an optical sensor that is positioned to capture images of the user's eye. The second 515 may be an EMG sensor that is either contacting or in close proximity of the temple region of the user as shown in FIG. 5A. An EMG sensor may be placed in other positions, for example, below the user's eye, near the inner corner of the eye, etc. In some embodiments, two or more EMG sensors may be placed in different areas. The second sensor 515 may be other types of sensors such as a low resolution image sensor, a high frame-rate image sensor, an optical reflector sensor, a range sensor, an optical flow sensor, and a microphone. In embodiments in which the second sensor is an image or optical sensor, the second sensor 515 may be placed near the first sensor 513. The placement of sensors in FIG. 5A are provided as an example only. Generally, the placement of the sensors may be configured variously based on sensor type and the user's physiology without departing form the spirit of the present disclosure.

Referring to FIG. 5B, there is shown an illustration of a virtual reality type HMD device with which the technique disclosed herein may be implemented. The HMD device 520 encloses the field of vision of the user. Image sensor and low latency sensor described herein may be placed on the user facing side of the HMD. For example, an image sensor may be positioned just above the display screen inside the HMD device 520 and a second sensor may be positioned on a portion of the HMD device 520 resting against the orbital or periorbital areas of the user.

In both FIGS. 5A-5B, the locations tracked and predicted using the combination of two sensors described herein may be used by the HMDs 500 and 520 to render computer generated graphics to display to the user based on one or more of the user's current and predicted future gaze location.

For example, the determined locations may be used by the processor of the HMDs 500 and 520 to determine the appropriate content and perspective of the rendered frames. The determined and estimated gaze locations may also be used to predict a future gaze location which allows the computer to determine the fixation point of the user when the next frame is displayed to facilitate foveated rendering.

In some embodiments, one or more of the embodiments, methods, approaches, and/or techniques described above may be implemented in one or more computer programs or software applications executable by a processor based apparatus or system. By way of example, such processor based apparatus or systems may comprise a computer, entertainment system, game console, workstation, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted or configured to cause a processor based apparatus or system to execute steps comprising: receiving a first measurement from a first sensor configured to detect a gaze location; determining an initial gaze location based at least on the first measurement; receiving at least one of eye motion amplitude and eye motion direction measurement from a second sensor; and determining an estimated gaze location based at least on the initial gaze location and the at least one of eye motion amplitude and eye motion direction.

While the invention herein disclosed has been described by means of specific embodiments and applications thereof, numerous modifications and variations could be made thereto by those skilled in the art without departing from the scope of the invention set forth in the claims.

What is claimed is:

1. A method comprising:
  receiving a first measurement from a first sensor configured to detect a gaze location;
  determining an initial gaze location based at least on the first measurement;
  receiving at least one of eye motion amplitude and eye motion direction measurement from a second sensor; and
  determining an estimated gaze location by combining at least the initial gaze location and the at least one of eye motion amplitude and eye motion direction measurement received from the second sensor.

2. The method of claim 1, wherein the determining of the estimated gaze location is further based on a plurality of measurements from the first sensor and a plurality of measurements from the second sensor.

3. The method of claim 1, wherein the first sensor comprises an optical image sensor.

4. The method of claim 1, wherein the second sensor comprise one or more of an electromyography (EMG) sensor, a low resolution image sensor, a high frame-rate image sensor, an optical reflector sensor, a range sensor, an optical flow sensor, and a microphone.

5. The method of claim 1, wherein the first sensor has a higher data reporting latency than the second sensor.

6. The method of claim 1, wherein a plurality of estimated gaze locations are determined between the first measurement and a second measurement of the first sensor.

7. The method of claim 1, wherein the determining of the estimated gaze location is based on an eye movement model.

8. The method of claim 7, wherein the eye movement model is calibrated by instructing a user to perform one or more eye movement patterns prior to the first measurement.

9. The method of claim 7, further comprising:
  receiving a second measurement from the first sensor;
  determining a second gaze location based on the second measurement from the first sensor; and
  adjusting the eye movement model based on the second gaze location.

10. The method of claim 1, further comprising: rendering one or more frames of a virtual reality scene based on the estimated gaze location.

11. A system comprising:
  a first sensor configured to detect a gaze location;
  a second sensor configured to measure at least one of eye motion amplitude and eye motion direction; and
  a processor communicatively coupled to the first sensor and the second sensor, the processor being configured to:
  receive a first measurement from the first sensor;
  determine an initial gaze location based on the first measurement;
  receive at least one of eye motion amplitude and eye motion direction measurement from the second sensor; and
  determine an estimated gaze location by combining at least the initial gaze location and the at least one of eye motion amplitude and eye motion direction measurement received from the second sensor.

12. The system of claim 11, wherein the estimated gaze location is determined further based on a plurality of measurements from the first sensor and a plurality of measurements from the second sensor.

13. The system of claim 11, wherein the first sensor comprises an optical image sensor.

14. The system of claim 11, wherein the second sensor comprise one or more of an electromyography (EMG) sensor, a low resolution image sensor, a high frame-rate image sensor, an optical reflector sensor, a range sensor, an optical flow sensor, and a microphone.

15. The system of claim 11, wherein the first sensor has a higher data reporting latency than the second sensor.

16. The system of claim 11, wherein a plurality of estimated gaze locations are determined between the first measurement and a second measurement of the first sensor.

17. The system of claim 11, wherein the estimated gaze location is determined based on an eye movement model.

18. The system of claim 17, wherein the eye movement model is calibrated by instructing a user to perform one or more eye movement patterns.

19. The system of claim 17, wherein the processor is further configured to:
receive a second measurement from the first sensor;
determine a second gaze location based on the second measurement from the first sensor; and
adjust the eye movement model based on the second gaze location.

20. The system of claim 17, wherein the processor is further configured to: render one or more frames of a virtual reality scene based on the estimated gaze location.

21. A system comprising:
a first sensor configured to detect a gaze location;
a second sensor configured to measure at least one of eye motion amplitude and eye motion direction; and
a processor communicatively coupled to the first sensor and the second sensor and configured to determine an estimated gaze location during a data reporting interval of the first sensor by combining at least an initial gaze location and the at least one of eye motion amplitude and eye motion direction measured by the second sensor.

22. The system of claim 21, further comprising:
an apparatus configured to be worn on a user's head and further configured to position at least the second sensor in close proximity of at least one of the user's eye.

23. A non-transitory computer readable storage medium storing one or more computer programs configured to cause a processor based system to execute steps comprising:
receiving a first measurement from a first sensor configured to detect a gaze location;
determining an initial gaze location based at least on the first measurement;
receiving at least one of eye motion amplitude and eye motion direction measurement from a second sensor; and
determining an estimated gaze location by combining at least the initial gaze location and the at least one of eye motion amplitude and eye motion direction measurement received from the second sensor.

* * * * *